Patented Aug. 8, 1933

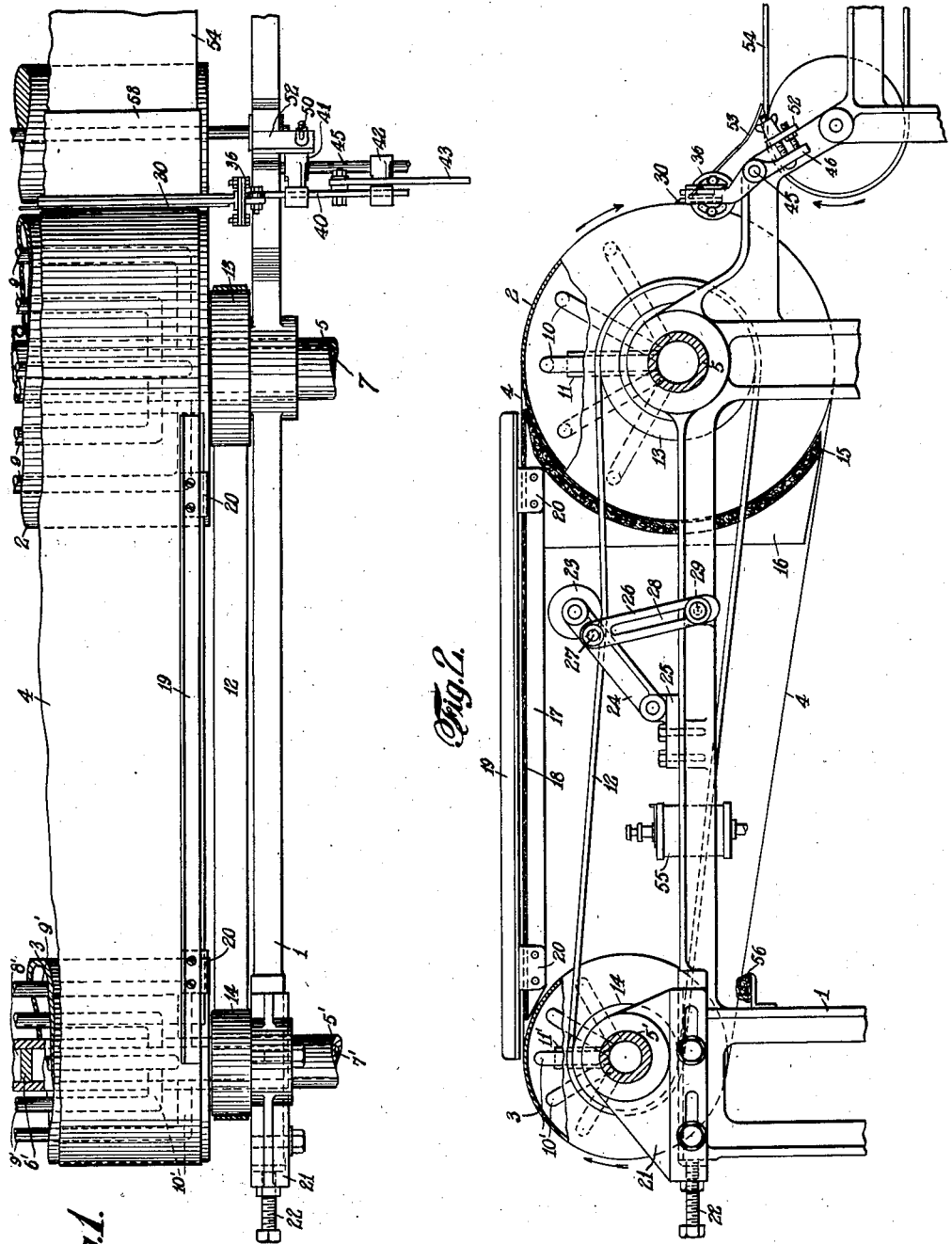

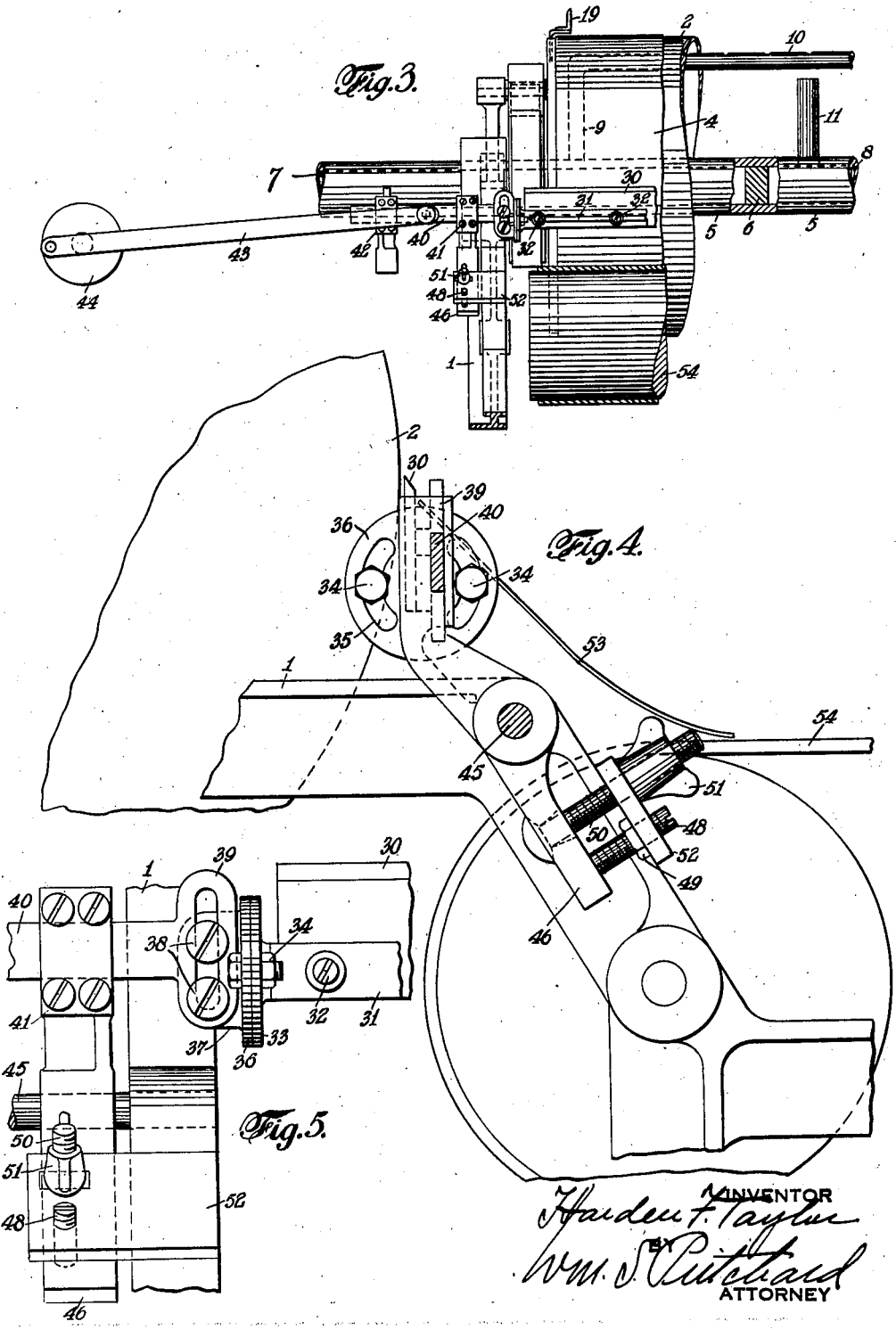

1,921,440

UNITED STATES PATENT OFFICE 1,921,440

METHOD OF AND APPARATUS FOR SKINNING FISH

Harden F. Taylor, Scarsdale, N. Y., assignor to The Atlantic Coast Fisheries Company, New York, N. Y., a Corporation of Maine Application October 30, 1930. Serial No. 492,133

19 Claims. (Cl. 17—2)

This invention relates to a method and apparatus for treating various wet articles and more particularly to a method of and apparatus for skinning fish, such as fillets.

Prior to this invention, machines for skinning fillets of fish had already been devised. One type of machine comprised a rotary drum having transverse slots in the periphery thereof in which one end of the fillet to be skinned was disposed. A gripping mechanism, usually automatically controlled, as by a cam mechanism, gripped the portion of the fillet inserted in the slot. In the gripped condition, the fillet, due to the rotation of the drum, was conducted into cooperative relation with a knife which severed the flesh portion from the skin. Subsequently, the skin held by the gripper was released. The gripper mechanism, even though it was intended to be automatically controlled, very often failed to properly and securely grip the fillet. As a consequence, the skinning operation produced undesirable results. Frequently, the knife tore or disfigured the flesh. Also, the gripping action itself, in many instances, tore or disfigured the flesh. In actual use and operation of apparatus of this type, it was not unusual that the gripping and releasing action failed to operate, and thus the efficiency of the skinning operation was materially decreased.

Another type of apparatus utilized a partial vacuum to maintain the fish against a perforated surface by means of differential air pressure. Such machines also had several disadvantages. In the first place, the fish was generally insecurely and loosely gripped. As a result, the skinning operation disfigured the flesh, and many times the fillet was improperly skinned. Moreover, the perforations became plugged with scales or particles of fish meat and thus the gripping means were rendered ineffective or inefficient. Sometimes the particles of fish were drawn into the vacuum system, which was very difficult to clean, and consequently the vacuum apparatus was rendered inoperative or highly unsanitary. Further, this method, due to the number of perforations and hence the amount of air drawn into the interior, necessitated a large amount of power to maintain the vacuum.

I have found that I can overcome the above-mentioned defects by disposing a wet object, such as a fish fillet, on a cold and/or refrigerated surface, whereby the entire contacting surface of the object is frozen and caused to tenaciously adhere to the support, performing some mechanical operation, such as skinning, cutting, etc., while the object is so gripped, and then releasing the remainder or residue from the cold surface by increasing the temperature of the supporting surface.

It is therefore an object of this invention to provide a method which comprises causing a wet object to be firmly gripped and secured to a surface by chilling the latter, whereby the contacting surface of the object is frozen, performing some mechanical operation on the object while so secured, and then releasing said object by increasing the temperature of the support.

Another object of this invention is a method of skinning fish, such as fish fillets, which comprises disposing a fish fillet on a cold surface whereby the contacting surface of the fillet is frozen and the fillet tenaciously secured to said cold surface, skinning the fillet while so gripped, and then releasing the portion adhering to said cold surface by increasing the temperature of the latter.

A further object of this invention is a method which comprises substantially momentarily freezing the skin surface of a fillet in contact with some suitable refrigerated support whereby the fillet is made to securely adhere thereto, severing the flesh from the skin while the latter is in the frozen state, increasing the temperature of the support whereby the frozen skin is defrosted and the bond between it and the surface broken.

A still further object of this invention is an apparatus for carrying out the above-mentioned methods.

An additional object of this invention is an apparatus which comprises a surface upon which a wet object, such as a fish fillet, is disposed, means for chilling said surface whereby the contacting surface of the fillet is frozen and caused to tenaciously adhere to said surface, means to perform a mechanical operation on the object so gripped, and means to increase the temperature of the support to release the object.

Another object of this invention is an apparatus which comprises a continuous belt of a heat-conductive material on which the wet object to be treated is disposed, means to chill said belt during a portion of its travel whereby the contacting surface of the object is caused to freeze and tenaciously adhere to said belt, means to increase the temperature of the belt at a different stage of its travel to release the object from said belt, and means interposed between the chilling and warming means, and preferably adjacent the chilling means, to perform a mechanical operation on the object.

A specific object of this invention is a skinning apparatus comprising a continuous belt of a good thermal conductivity on which fillets are disposed, a plurality of drums over which the belt travels, one of said drums being adapted to chill the portion of the belt contacting therewith whereby the contacting surface of each fillet is frozen and made to firmly adhere to the belt, the other drum being adapted to increase the temperature of the portion of the belt contacting therewith and release the residue gripped by said belt, and a skinning mechanism disposed between said drums and preferably adjacent the chilling drum, said skinning mechanism preferably being adjustable with relation to the belt and drum.

Another specific object is the provision of means to insure a better thermal contact between the belt and the drum.

A still further specific object is the means for cooling and/or raising the temperature of the belt.

Other objects will appear from the following description, appended claims and accompanying drawings, wherein one modification of an apparatus capable of carrying out the method constituting one part of this invention is illustrated, and wherein:

Figure 1 is a broken top plan view;
Figure 2 is a side elevation;
Figure 3 is an end view partly in section illustrating the cutting mechanism and the interior construction of the drums;
Figure 4 is an enlarged side elevation of the cutting mechanism; and
Figure 5 is an enlarged detail of the knife carrier and its appurtenant parts.

As is apparent from the foregoing, the invention comprises in disposing a wet object on a surface which, upon chilling, quickly freezes the entire immediate contacting surface of the object and causes the latter to tenaciously adhere to the cold surface with a firm grip. While so securely held, the object is submitted to a mechanical operation, and the portion of the article remaining on the support is subsequently released by increasing the temperature of said support. In other words, by providing appropriately shaped surfaces of metal or other material of good thermal conductivity in combination with means for quickly cooling and warming them, I am enabled to take a firm grip over the entire extent of the surface of one side of a wet object, such as a fillet of fish, and perform any mechanical operation thereupon, such as skinning, and then quickly release the fillet without mutilating or damaging the article operated on in any way. At the same time the apparatus is maintained and the method carried out under the most sanitary conditions which are extremely essential when food products or comestibles are treated.

It is obvious that in applying this principle it may be adapted to a great many machines. Hereafter in order to more clearly explain the method and apparatus, there is described one modification of a skinning machine. It is to be understood that this specific adaptation is merely illustrative and not limitative of the invention.

According to this embodiment, a thin metal belt constitutes the surface upon which the fillet of fish is placed with the skin thereof in direct contact with the belt. The belt is caused to move continuously over drums, one of said drums being refrigerated to a low temperature and the other warmed by appropriate means. When the belt contacts with the chilled drum, the temperature thereof is quickly lowered and the skin surface of the fillet in contact therewith freezes in a very short interval of time, whereby a firm tenacious grip between the entire contacting surface of the fillet and belt is procured. The gripping action is maintained during the mechanical operation of skinning the fillet with any suitable cutting mechanism. The unfrozen flesh portion falls off and is removed by any suitable means while the frozen skin adheres to the belt until the latter contacts with the second drum, which increases the temperature, whereby the skin is substantially and immediately released.

Referring to the drawings, wherein like reference numerals designate like parts, the reference numeral 1 designates a suitable frame on which the apparatus is mounted. The apparatus consists of two drums 2 and 3 over which a belt 4 of metal or any other good thermal conducting material travels and on which the materials to be treated are disposed. Both of the drums 2 and 3 are similarly constructed and mounted, and in actual practice the drum 2 is so designed that it is chilled or refrigerated and the drum 3 is so constructed that it is maintained at a temperature above the freezing point of water. Hence, when the belt 4 travels over and contacts with the drum 2, the former will be chilled, whereby the contacting skin surface of each fillet will substantially instantly freeze and tenaciously adhere thereto. Similarly, when the said belt passes over and contacts with the drum 3, it will be warmed sufficiently to cause any frozen material adhering thereto to defrost and be substantially instantly released.

The drum 2 is rotatably mounted on a fixed hollow shaft 5 suitably mounted on the frame 1. By means of a partition, such as a plug 6, conveniently disposed and preferably at some point in the interior of the drum, the hollow shaft 5 is divided into two separate parts constituting an inlet 7 and an outlet 8 for the refrigerating medium. The refrigerating medium is caused to impinge on a portion of the interior peripheral surface of the drum through the medium of a plurality of horizontally disposed perforated pipes 9 extending over the interior width of the drum and connected to the inlet 7 through the branches 10. After impinging on the peripheral surface, the refrigerating medium is permitted to remain within the drum and an overflow 11 is provided to maintain the level of the refrigerating medium within the drum substantially uniform. When the level of the refrigerating medium in the drum is higher than the height of the overflow 11, it will flow therethrough into the outlet 8, from whence it would be conducted to either a sewer or, preferably to the original source of supply.

The number of perforated pipes 9 which may be utilized for impinging the refrigerating medium upon the interior periphery of the drum depends upon the height of the refrigerant to be maintained within the drum and is also determined by the surface of the drum desired to be strongly chilled. For illustrative purposes, five of such pipes are illustrated in the drawings.

The warming drum 3, as previously stated, is similarly constructed to the chilling drum 2. It, too, is rotatably mounted but on the fixed hollow shaft 5' which is provided with a plug 6' and with an inlet 7' and an outlet 8'. Similarly, the inlet 7' is connected through branches 10' to perforated pipes 9' for causing the warming medium to be impinged upon the interior periphery of the drum. As shown in Figure 2 of the drawings, it also is provided with an overflow 11' whereby the level of the warming medium within the drum may be maintained substantially uniform.

The drums 2 and 3 are rotatably mounted on the shafts and are driven in a direction shown by the arrows by a belt 12 through pulleys 13 and 14 suitably connected to a transmission of any appropriate driving mechanism (not shown).

The drum 2 is insulated in order to increase its efficiency. Though it is obvious that it may be insulated in various manners, I prefer to surround a portion of its periphery, and preferably that portion which is not in contactual relation with the drum, with a heat-resisting material, such as felt 15, disposed on a wooden block 16 secured to the frame of the machine in any well-known manner. If desired the drum 3 may be similarly insulated.

The belt 4 is adapted to carry the articles to be mechanically processed, and in many cases the weight of the quantity of material disposed thereon may have a tendency to cause the belt to buckle or sag. To overcome this, there is provided a wooden block 17 provided with a felt surface 18 beneath the upper run of the belt. Also, to guide the belt there are provided guides 19 adjacent both edges of said belt along its upper run. These guides are secured by means of brackets 20 to the block 17. Suitable means may also be provided to adjust the tension of the belt 4. In the drawings and particularly Figure 2, the bearing 21 carrying the drum 3 is adjustable through the screw 22 whereby the tension of the belt may be increased or decreased as desired. The tension of the driving belt 12 may also be adjusted, and in the drawings a means for accomplishing this comprises an idler roller 23 resting on the belt 12 and carried by an arm 24 pivotally mounted on a lug 25 secured to the frame of the machine. To the arm 24, an arm 26 is pivotally connected at any convenient point, as for instance at 27. The arm 26 is formed with a slot 28 which cooperates with a screw 29 whereby the arm may be adjusted and locked in any position. It is apparent that raising, lowering, or inclining the arm 26, the arm 24 and hence the roller 23 may be similarly raised, lowered, or inclined, and thus the tension of the driving belt may be increased or decreased.

The invention in one of its phases contemplates the skinning of fish, such as fillets of fish, the skinning operation being carried out while the skin surfaces thereof are in a frozen condition. As is apparent from the preceding, the freezing is obtained while the belt 4 is in contact with the refrigerating drum 2. Accordingly, any suitable cutting mechanism may be disposed in cooperative relationship with the belt 4 prior to its contact with the drum 3. Preferably, the skinning mechanism is mounted adjacent the drum 2.

It is obvious that any cutting means may be employed and the cutting mechanism hereafter described is merely one specific exemplification which has given satisfactory results.

The cutting mechanism comprises a knife 30 secured to a support 31 by means of screws 32. The knife support 31 is formed or provided at one end thereof with a disc 33. The disc 33 is provided with a plurality of holes which receive bolts 34, the latter cooperating with the arcuately shaped slots 35 in discs 36. Hence, by rotating the disc 33 the knife may be positioned at any angle relative to the drum. The nuts on the bolts 34 serve to lock the elements in adjusted position.

The cutting mechanism is also so constructed that it may be adjusted in a vertical direction to take care of the wear of the knife. With this in view, the disc 36 is provided with a lug or casting 37 carrying bolts 38 cooperating with a slotted member 39. Upon loosening of the bolts 38, the disc 36 may be raised or lowered to the desired position. When in proper position, the bolts 38 are secured in place and serve to lock the elements. Since the disc 33 to which the knife carrier 31 is secured is connected to the disc 36, the upward or downward movement of the latter will also cause the knife to be raised or lowered.

The cutting operation may be facilitated by reciprocating the cutting element. This in the instant device is secured by forming the slotted member 39 with a horizontal extension or slide 40 which is caused to pass through the guide bearings 41 and 42 and reciprocated by any suitable means, such as an eccentric rod 43, secured to the slide 40 at a point intermediate the bearings 41 and 42. The eccentric rod 43 is appropriately connected or secured to an eccentric 44 which is actuated by any well-known means. The bearings 41 and 42 are mounted on and keyed to the shaft 45 which is suitably disposed in the framework.

The bearing 41 is provided with an extension 46 pivoted at 45 and which serves for the setting of the knife to secure the proper clearance with respect to the belt 4. This is achieved by means of a set screw 48, a lock nut 49 which permits the adjustment, a screw 50, and a thumb nut 51 on a plate 52, which effect the locking in adjusted position. This arrangement is such that, if sharpening of the knife 30 is required, the thumb nut 51 is loosened and the shaft carrying the bearings turned around, whereby the knife is carried away from the drum. After sharpening, when the knife is back in place, the set screw 48 will provide the same setting of the knife as before sharpening.

Adjacent the cutting mechanism is an apron 53 which is adapted to receive the portions of the flesh severed from the skin and conduct them to a travelling conveyor 54 which carries the skinned fillets to any suitable place.

A reservoir 55 similar to any well-known oil reservoir is positioned so that it drips a suitable kind of an anti-freezing liquid on the under side of the belt. This liquid, such as glycerin, ethylene glycol, or solutions thereof, or calcium chloride brine, prevents the accumulation of snow or frost on the belt and also serves to make a more intimate thermal contact between the belt and the drum, thus facilitating rapid heating and cooling of the belt. A wiping mechanism 56, such as a sponge, felt or other means, is provided adjacent the longitudinal edges of the belt to remove any excess of the anti-freezing liquid, whereby any dripping of this material on the opposite surface of the belt is prevented.

In operation the refrigerating medium is continuously introduced into the drum 2 and the warming medium in the drum 3, as previously described, and the overflow maintains the level of liquid within the drums at the desired heights. By means of the pulleys 13 and 14 and the belt 12 trained thereover, the drums are rotated and the belt 4 caused to travel. The operator places the wet objects, such as fillets, with the skin surfaces in contact with the belt 4. Preferably, the fillets are disposed on the belt at some point subsequent to the belt's contact with the drum 3. It is desirable that the objects placed upon the belt 4 be so disposed that the entire contacting surfaces thereof be in intimate contact with the belt. Usually, the operator will smooth out the articles and exert a small amount of pressure to attain this. On the other hand, any suitable mechanical contrivance, such as rolls, squeegees, and the like, may be used to secure this. The fillets having been positioned on the belt, the belt in its course of travel comes in contact with the drum 2. Due to the nature of the materials of which the belt and drum 2 are constructed, the heat from the belt is readily and quickly withdrawn, whereby the wet surfaces contacting with the belt are caused to substantially instantly freeze and tenaciously adhere thereto. While in this frozen condition, the fillets are brought into cutting relation with the reciprocating knife 30 which severs the flesh from the frozen skin. The severed flesh falls upon the apron 53 which feeds it to the belt 54 from carries it to whatever location is desired. The skin still in the frozen state, however, remains upon the belt until the belt contacts with the periphery of the drum 3. Here the warm temperature of the drum 3 increases the temperature of the belt sufficiently to cause the frozen material to defrost sufficiently to substantially instantly be released and drop therefrom. An anti-freeze liquid is dripped upon the under side of the belt to prevent the accumulation of frost and snow as well as to provide a more intimate thermal contact and liquid seal between the belt and the drums.

It is apparent that various modifications in the specific construction described may be made without departing from the nature or spirit of the invention. For instance, other chilling and cooling means than that herein described may be used. Also, a stationary support may be used instead of a travelling conveyor, and the refrigerating and warming mediums supplied through suitable pipe and valve arrangements.

From the above it is apparent that I have devised a method which comprises securing a wet object on a support by freezing the immediate contacting surface of the object, and while in this state, performing any mechanical operation. When this principle is applied to skinning fish fillets, it results in a clean, unmutilated and undamaged product.

In the claims, the term "fish fillet", "fillet", or equivalent is also intended to cover whole fish.

I claim:

1. A method which comprises causing a fish fillet to tenaciously adhere to a support by substantially momentarily freezing only the skin surface of the fish fillet on a suitable support and severing the flesh from the skin while the fillet is so held.

2. A method which comprises disposing a fish fillet on a cold surface whereby the contacting surface is frozen and the fillet tenaciously adheres to said cold surface, skinning the fillet, and then releasing the portion adhering to said cold surface by warming the latter.

3. A method which comprises disposing the skin surface of a fish fillet on a cold surface whereby said skin surface is frozen and the fillet tenaciously adheres to the cold surface, severing the flesh portion from the skin, and releasing the skin adhering to the cold surface by warming the latter.

4. An apparatus of the class described comprising a continuous belt formed of a heat-conductive material on which a wet object is to be disposed, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith and cause the article to be released, and means interposed between said drums and in cooperative relationship with said belt to perform a mechanical operation on the object while gripped by said belt and as it is carried past said means with said belt.

5. An apparatus of the class described comprising a continuous belt formed of a heat-conductive material on which a wet object is to be disposed, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith and cause the article to be released, and means disposed adjacent the cooling drum and in cooperative relationship with said belt to perform a mechanical operation on the object while gripped and conveyed by said belt.

6. An apparatus of the class described comprising a continuous belt formed of a heat-conductive material on which a wet object is to be disposed, means to chill said belt to cause said object to tenaciously adhere thereto, means to perform a mechanical operation on the object while so gripped, means to increase the temperature of said belt to release said object from said belt, and means to prevent the accumulation of frost or snow on said belt.

7. An apparatus of the class described comprising a continuous belt formed of a heat-conductive material on which a wet object is to be disposed, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith and cause the article to be released, means interposed between said drums to perform a mechanical operation on the object while gripped by said belt, and means to prevent the accumulation of frost or snow on said belt and effect a better thermal contact between said belt and said drums.

8. An apparatus of the class described comprising a continuous belt formed of a heat-conductive material on which a wet object is to be disposed, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith and cause the article to be released, means disposed adjacent the cooling drum to perform a mechanical operation on the object while gripped by said belt, and means to prevent the accumulation of frost or snow on said belt and effect a better thermal contact between said belt and said drums.

9. A skinning machine comprising a support on which a wet fish fillet is disposed with the skin surface in contact therewith, means to chill said support to cause said fillet to tenaciously adhere to said support, means to skin said fillet, and means to increase the temperature of said support to release the skin from said support.

10. A skinning machine comprising a continuous belt formed of a heat-conductive material on which a fish fillet is to be disposed with the skin surface in contact therewith, means to chill said belt to cause the fillet to tenaciously adhere to said belt, means to skin said fillet, and means to increase the temperature of said belt to release the skin from said belt.

11. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, and means interposed between said drums to skin said fillet while it is gripped by said belt.

12. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, and means adjacent the cooling drum to skin said fillet while it is stripped by said belt.

13. A skinning machine comprising a continuous belt formed of a heat-conductive material on which a fish fillet is to be disposed with the skin surface in contact therewith, means to chill said belt to cause the fillet to tenaciously adhere to said belt, means to skin said fillet, means to increase the temperature of said belt to release the skin from said belt, and means to prevent accumulation of frost or snow on said belt.

14. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, means interposed between said drums to skin said fillet while it is gripped by said belt, and means to prevent accumulation of frost or snow on said belt and to effect a better thermal contact between said belt and drums.

15. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, means adjacent the cooling drum to skin said fillet while it is stripped by said belt, and means to prevent accumulation of frost or snow on said belt and to effect a better thermal contact between said belt and drums.

16. A skinning machine comprising a continuous belt formed of a heat-conductive material on which a fish fillet is to be disposed with the skin surface in contact therewith, means to chill said belt to cause the fillet to tenaciously adhere to said belt, means to skin said fillet, means to increase the temperature of said belt to release the skin from said belt, and means in any position relative to adjust the skinning means relative to the belt.

17. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, means interposed between said drums to skin said fillet while it is stripped by said belt, and means to adjust the skinning means in any position relative to the belt.

18. A skinning machine comprising a continuous belt formed of a heat-conductive material on which a fish fillet is to be disposed with the skin surface in contact therewith, a plurality of drums over which said belt travels, means to chill one of said drums whereby the portion of the belt contacting therewith is chilled and the object is caused to tenaciously adhere to said belt, the other drum being maintained at a temperature sufficient to increase the temperature of the portion of the belt contacting therewith to cause the portion of the fillet remaining thereon to be released, means adjacent the cooling drum to skin said fillet while it is stripped by said belt, and means to adjust the skinning means in any position relative to the chilling drum and belt.

19. An apparatus of the class described comprising a belt of a heat-conductive material, a plurality of drums over which said belt travels, one of said drums being maintained at a temperature sufficient to chill the portion of the belt contacting therewith and the other being maintained at a temperature sufficient to increase the temperature of the portion of the belt contacting therewith, and means to apply a substance or composition on the under surface of said belt to effect a better thermal contact between said belt and drums.

HARDEN F. TAYLOR.